(12) United States Patent
Wübbels et al.

(10) Patent No.: US 6,502,378 B2
(45) Date of Patent: Jan. 7, 2003

(54) FORAGE HARVESTER HEADER HAVING CONVEYOR ARRANGEMENT FOR CONTROLLING CROP STALKS

(75) Inventors: Richard Wübbels, Rhede (DE); Norbert Wolters, Gescher (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/915,462

(22) Filed: Jul. 26, 2001

(65) Prior Publication Data

US 2002/0020162 A1 Feb. 21, 2002

(30) Foreign Application Priority Data

Aug. 1, 2000 (DE) .......................... 100 37 534

(51) Int. Cl.⁷ ............................................. A01D 45/00
(52) U.S. Cl. ............................................ 56/103; 56/119
(58) Field of Search .............................. 56/51, 53, 60, 56/62, 64, 103, 104, 105, 109, 118, 119, 341, 343, DIG. 5

(56) References Cited

U.S. PATENT DOCUMENTS

| 2,214,113 A | * | 9/1940 | Urschel ....................... 56/103 |
| 3,331,196 A | * | 7/1967 | Grant .......................... 56/106 |
| 3,646,737 A | * | 3/1972 | Grant .......................... 56/106 |
| 3,742,687 A |   | 7/1973 | Kalkwaf |
| 4,137,695 A | * | 2/1979 | Sammann ..................... 56/106 |
| 4,346,548 A | * | 8/1982 | Atkinson ...................... 56/119 |
| 4,476,667 A | * | 10/1984 | Moss ........................... 56/106 |
| 5,852,922 A | * | 12/1998 | Over Behrens et al. ...... 56/102 |
| 6,298,643 B1 | * | 10/2001 | Wuebbels et al. ............ 56/119 |

FOREIGN PATENT DOCUMENTS

| DE | 195 27 607 | 1/1997 |
| DE | 195 31 918 | 3/1997 |
| EP | 0 069 898 | 1/1983 |

* cited by examiner

Primary Examiner—Robert E. Pezzuto
Assistant Examiner—Nathan Mammea

(57) ABSTRACT

A forage harvester header includes a plurality of intake and mowing arrangements disposed side-by-side across the width of the header and adapted for being driven about respective upright axes. Located behind the intake and mowing arrangements and leading to a centrally located discharge channel is a transverse conveying channel having upright conveying drums associated therewith to aid in moving the harvested crop stalks toward the discharge channel. A table is provided across the top of the center two intake and mowing arrangements and mounted centrally in the table is a conveyor arrangement which operates to gather and deliver rearwardly any crop stalks which emerge from the transverse conveying channel and go across the table in the vicinity of the conveyor arrangement.

8 Claims, 2 Drawing Sheets

FORAGE HARVESTER HEADER HAVING CONVEYOR ARRANGEMENT FOR CONTROLLING CROP STALKS

FIELD OF THE INVENTION

The invention concerns forage harvesters and more specifically to crop control devices for headers for such harvesters.

BACKGROUND OF THE INVENTION

EP-0 069 898 A describes a multi-row harvesting machine, particularly for corn, in which two cutting and intake drums with cutting arrangements underneath them are arranged side-by-side relative to each other, which cut crop standing on a field and deliver it to intake rolls, that conduct the cut crop to a chopper arrangement. In order to remove the harvested crop from the intake drums and deliver it to the intake rolls, strippers are provided that are arranged ahead of the center of the intake channel formed by the intake rolls. The free ends of the strippers form a vertical slot between which a guide component is provided, that projects upward out of the slot between the free ends of the strippers.

DE 195 27 607 A proposes a mowing arrangement for crops having stalks, that is provided with several mowing disks arranged alongside each other with conveyor disks arranged above them. The harvested crop is taken out of the conveying disks by removal disks and conducted to intake rolls arranged in an intake channel, that conduct it to a chopper arrangement. The removal disks of the two center conveyor disks are arranged immediately ahead of the intake channel. Above these removal disks, an edge extending transverse to the direction of operation is provided that is formed by the rear side of the center divider point, and prevents cut crop stalks from being drawn towards the front through the inner removal disks.

In known machines for mowing crops having stalks (DE 195 31 918 A) that are provided with several mowing and intake drums arranged alongside each other, the crop harvested by the outer mowing and intake drums is initially transported to the side at the rear side of the machine in a transverse channel and then introduced into the intake channel, that is, deflected through 90° towards the rear, or opposite to the direction of operation.

It occurs occasionally that, for example, during the harvest of silo corn, only one or two rows of plants remain standing at the edge of a field. These plant rows can be cut and drawn in only with the outer mowing and intake drums of the machine. In the case of a very wide machine, for example, a configuration encompassing eight or ten plant rows, the plants must be transported over a longer path through the transverse conveying channel to the center of the machine. Since no other plants are coming in to the center mowing and intake drums, the plants that have been cut are not supported by material entering the transverse conveying channel, but remain lying in it relatively loosely. As a result of a high center of gravity, the plants will bend downward more and more during the transport in the transverse conveying channel and then slide out of the transverse conveying channel with their lower ends. At the sides ahead of the intake channel, slope conveyor drums are not in a position to grasp the plants projecting with their lower ends out of the transverse conveying channel. The plants come to rest in the transverse direction in front of the transverse conveying drums and then block any further flow of the harvested crop. The clamping effect could be improved by a narrowing of the transverse conveying channel, but in normal operation, that is when plants are being taken in over the entire width of the machine, problems with throughput will be encountered.

The guide components known from EP 0 069 898 A and the edge arranged above the center strippers of DE 195 27 607 A cannot solve the problem either.

The problem underlying the present invention is seen in the need for improving the conveying of harvested crop in a forage harvester, particularly if only one part of the mowing and intake drums is being supplied with plant material.

SUMMARY OF THE INVENTION

According to the present invention, there is provided a stalk crop harvesting implement having a header with improved feeding characteristics.

An object of the invention is to provide a header for a forage harvester which effectively controls the delivery of the harvested crop stalks to a discharge channel of the header.

A more specific object of the invention is to provide a header having a plurality of intake and mowing arrangements located in side-by-side relationship to each other across the width of the header and ahead of a transverse conveying channel leading to a discharge channel, and to equip the header with a conveying arrangement for gathering and delivering to the rear any crop stalks which emerge from the conveying channel.

These and other objects of the invention will become apparent from a reading of the ensuing description together with the appended drawings.

DESCRIPTION OF THE PREFERRED EMBODIMENT

Figure 1:
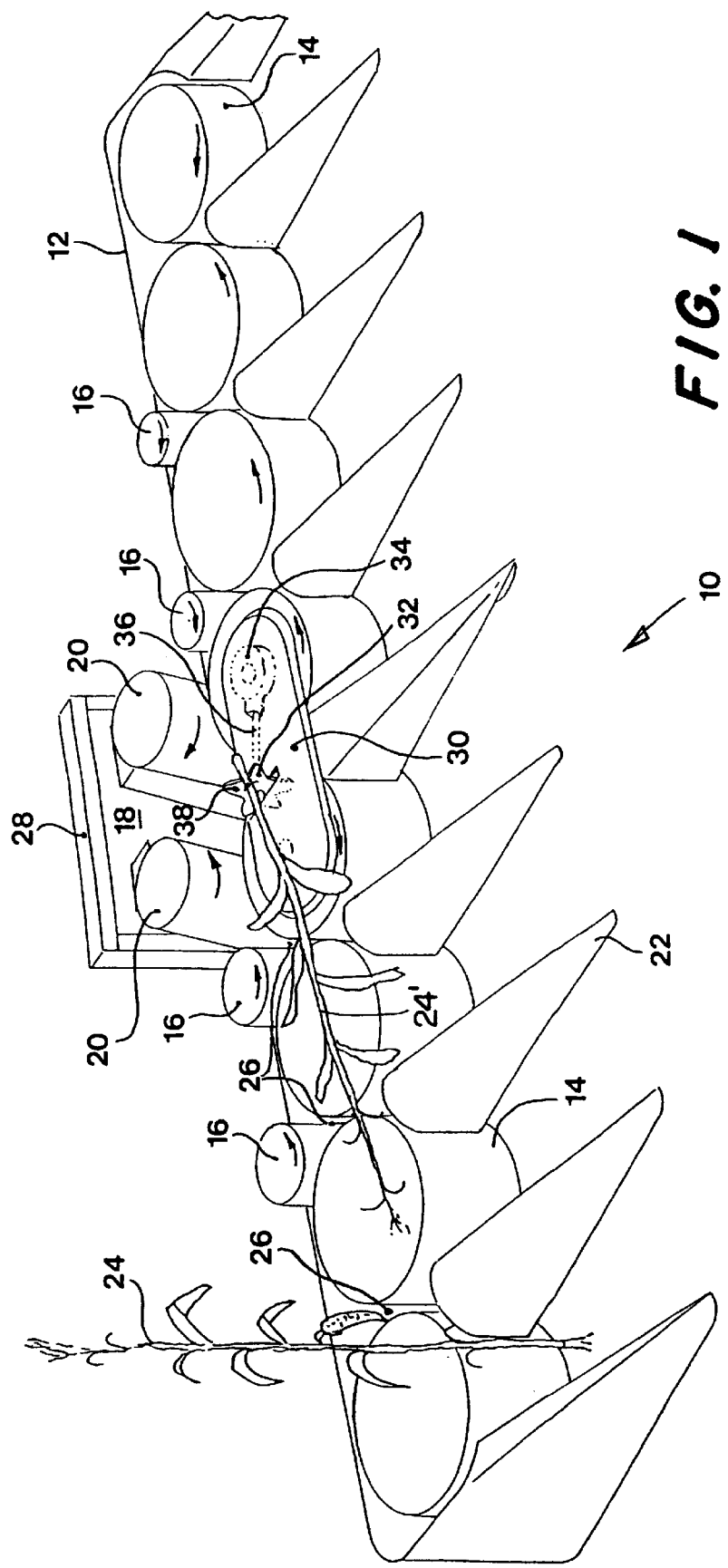
FIG. 1 is a schematic, right front perspective view of a forage harvester header constructed in accordance with a first embodiment of the invention.

Referring now to FIG. 1, there is shown a forage harvester header 10 having a frame 12 on which eight intake and mowing arrangements 14 are arranged side-by-side to each other. The intake and mowing arrangements 14 each consist, in a manner known in itself, of conveyor disks arranged coaxially over associated mowing disks having a plurality of pocket-shaped recesses distributed over their circumference. The conveyor disks grasp and transport the stalk-like harvested crop that was cut from the surface of the field by means of the mowing disks. The number of intake and mowing arrangements 14 of the header 10 can be chosen freely, hence more or fewer than eight intake and mowing arrangements 14 can be employed. On the rear side of the intake and mowing arrangements 14, the harvested crop is taken out of the conveyor disks by removal devices (not shown in the drawing for the sake of clarity), that are configured as rotating disks or stationary elements, and conveyed sideways toward the center of the header 10 by transversely spaced conveyor drums 16 that interact with the intake and mowing arrangements 14, and that are equipped with projecting driver teeth which penetrate corresponding slots in a rear wall of the frame 12.

At the center of the rear of the header 10, a discharge channel 18 of the header 10 is arranged. The harvested crop is conveyed into the discharge channel 18 in the center of the header 10 by a pair of slope conveyor drums 20, that are also equipped with toothed drivers. The conveyor drums 20 are arranged on opposite sides of and ahead of the discharge channel 18. The axes of rotation of the slope conveyor drums 20 are inclined toward the front. The intake and mowing arrangements 14 are driven about approximately vertical axes of rotation, or axes that are inclined slightly forward. The transverse conveyor drums 16 and the slope conveyor drums 20 are coupled to a drive so that they may be put into rotation. The header 10 is that for a self-propelled forage harvester and the power for driving the various drives is provided by an engine of the machine, which also powers drive wheels for moving the harvester over a field in the forward direction of travel. The header 10 includes a carrier frame 28 located centrally behind the discharge channel 18 which is fastened, so that it can be removed, to the forward end of the self-propelled forage harvester. The directions of rotation of the intake and mowing arrangements are opposite on the opposite sides of a vertical longitudinal center plane of the header 10, where each of the three inner intake and mowing arrangements 14 rotate in an opposite direction than does the outermost intake and mowing arrangement 14.

If the header 10 is moved over a field, standing plants 24 are pushed to the side, if necessary by means of stalk dividers 22, and grasped by the intake and mowing arrangements 14, which operate independent of rows, and cut from the ground. Then the plants 24 are transported transverse to the forward direction of operation to the center of the header 10 in the transverse conveying channel 26, that is defined between the rear wall of the header 10 and the transverse conveyor drums 16, on the one hand, and the intake and mowing arrangements 14, on the other hand. There they are conveyed by the slope conveyor drums 20 into the discharge channel 18.

Figure 2:
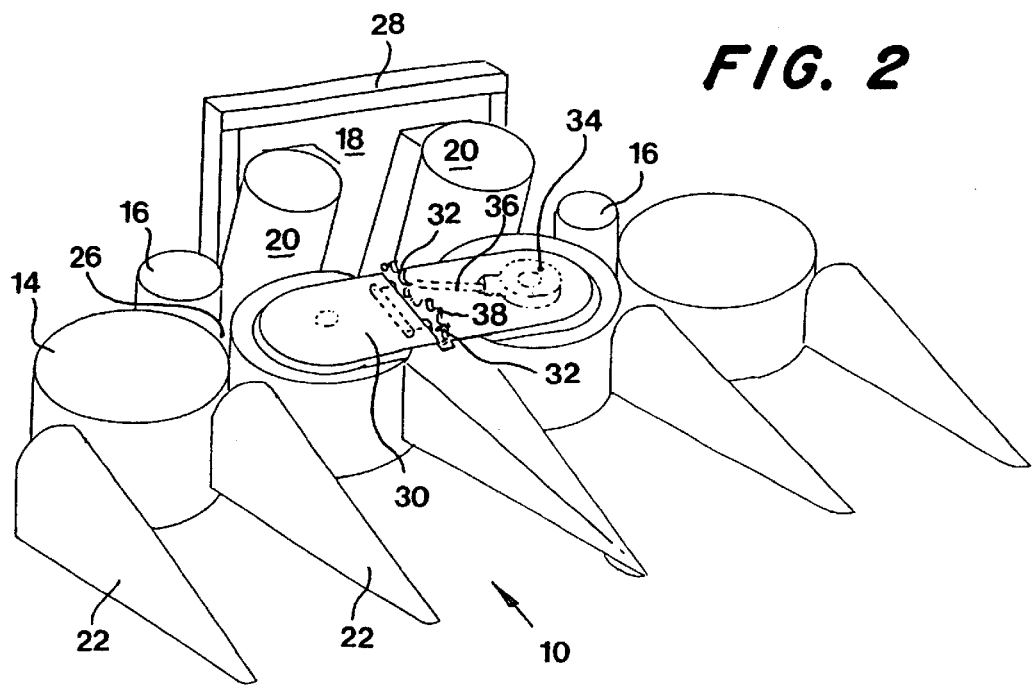
FIG. 2 is a schematic, right front perspective view of the front of a forage harvester header constructed in accordance with a second embodiment of the invention.
Figure 3:
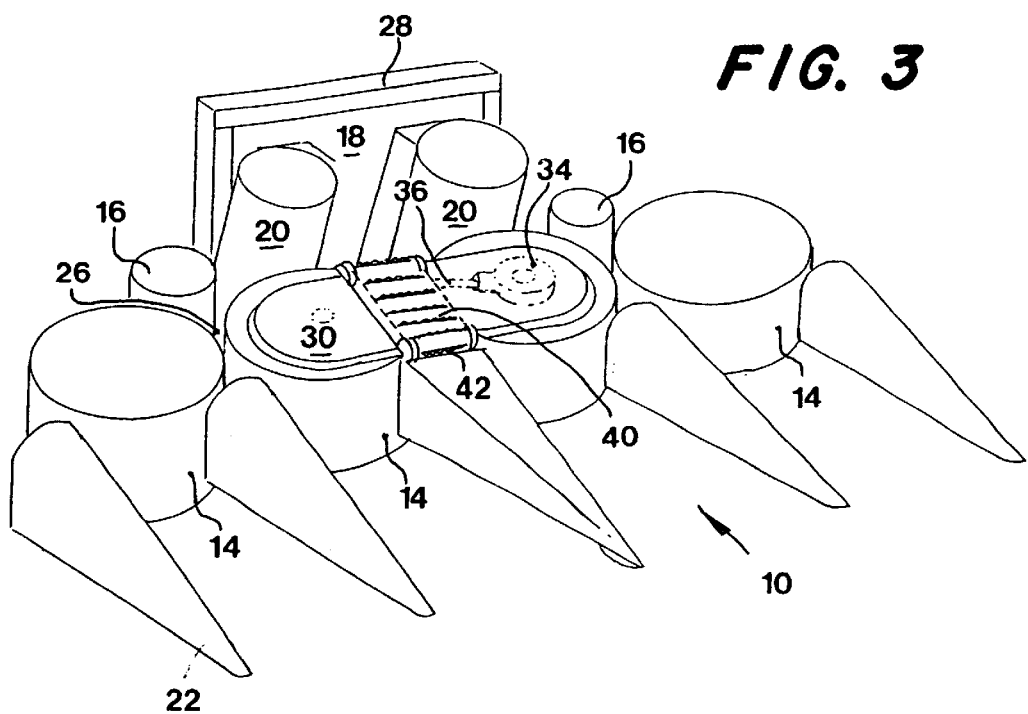
FIG. 3 is a schematic, right front perspective view of a forage harvester header constructed in accordance with a third embodiment of the invention.

It should be noted that the configuration of the transverse conveying channel 26 can be selected freely within the scope of the invention. FIGS. 1 through 3 are concerned with a channel formed between the rear wall of the header 10 and the intake and mowing arrangements 14 arranged ahead of it through which the harvested crop is transported by the intake and mowing arrangements 14 interacting with the transverse conveyor drums 16 arranged behind them or with driven removal disks or transverse conveying bands (DE 195 27 607 A; DE 195 31 918 A and DE 198 56 444 A). A transport of the harvested crop in the transverse conveying channel 26 independent of the intake and mowing arrangements 14 is also conceivable, which can be accomplished by separate conveyors, for example, in the form of a conveyor band or screw conveyors (GB 2 012 154 A).

In case only an outer intake and mowing arrangement 14 is supplied with harvested crop, it is conceivable, in particular, that individual plants cannot be retained securely in the transverse conveying channel 26 by the other intake and mowing arrangements 14 due to an insufficient supply of harvested crop. These plants 24 may fall over, as is the plant identified in FIG. 1 with the number call-out 24', as a result of its relatively high center of gravity, and slide out of the transverse conveying channel 26 with its lower end. In such a case, it is possible that the plant comes to rest on a plate-shaped center table 30 arranged between the two central intake and mowing arrangements 14. In known headers 10 for mowing of the stalks of crop such as corn, the operator must stop the engine of the forage harvester, climb out of the operator's cab and manually remove the plants 24' from the center table 30.

In order to avoid this disadvantage, a conveying arrangement 32, in the form of a star-shaped conveyor disk equipped with drivers 38, is arranged at the center of the upper surface of the center table 30 so that the disk lies in a vertical plane that is parallel to the forward operating direction. The conveying arrangement 32 penetrates an opening in the center table 30. It is connected, so as to be driven, with an intake and mowing arrangement 14 by a shaft 36 and a gear box 34. It is driven about a horizontal axis extending transverse to the forward direction of operation of the forage harvester, where the shaft 36 and the axis of rotation of the conveying arrangement 32 are located underneath the center table 30. The conveying arrangement 32 conveys plants 24', that have slid out of the transverse conveying channel 26, automatically again into the transverse conveying channel 26, since its upper side rotates in the direction towards the discharge channel 18 in normal harvesting operation. There the plants are conveyed by the slope conveyor drums 20 into the discharge channel 18.

Since the conveying arrangement 32 is coupled so as to drive the intake and mowing arrangements 14, the conveying arrangement 32 is driven in the reverse direction when the header is operated in the reverse direction. It supports the depositing on the center table 30 of the harvested crop thrown out of the discharge channel 18 during the reverse operation. If, after the reverse operation, the normal harvesting operation is again resumed, it conveys the harvested crop that was deposited on the center table 30 again into the transverse conveying channel 26, from which it reaches the discharge channel 18.

Referring now to FIG. 2, only the center four intake and mowing arrangements 14 are pictured. This embodiment differs from that shown in FIG. 1 in that instead of a single conveying arrangement 32, two conveying arrangements 32 are shown arranged on the table 30 for rotation about parallel axes, with one arrangement 32 being located directly ahead of the other. The two conveying arrangements 32 are driven so as to rotate in the same direction and make it possible for plants deposited over the entire fore-and-aft dimension of the center table 30 to be conveyed back into the transverse conveying channel 26 and from there into the discharge channel 18. In its remaining configuration, the header 10 is identical to that shown in FIG. 1, where corresponding components are identified by the same number call-outs.

FIG. 3 shows a third embodiment of the invention. In this embodiment, the forage harvester header 10 is equipped with a conveying arrangement 40 in the form of a fore-and-aft extending belt conveyor located in the center of the table 30 and including transverse ribs 42. A rear roller supporting the conveyor belt of the conveying arrangement 40 is driven by the gear box 34 of the intake and mowing arrangement 14 immediately to the left of the conveying arrangement 40, the direction of driving being such that the upper side of the conveyor belt, which is located above the center table 30, moves in the direction towards the discharge channel 18 during the normal harvesting operation. Any plants that have possibly emerged from the transverse conveying channel 26 are again conveyed automatically into the transverse conveying channel 26 in this way and reach the discharge channel 18 from there. Otherwise, the header 10 shown in FIG. 3 corresponds to the headers shown in FIGS. 1 and 2.

The operation of the header 10 of each of the embodiments is thought to be apparent from the foregoing description, suffice it to say that the conveying arrangements at the center of the headers act to intercept crop stalks which have emerged from the transverse channel 26 and deliver them back to the channel 26.

Having described the preferred embodiment, it will become apparent that various modifications can be made without departing from the scope of the invention as defined in the accompanying claims.

1. In a header, adapted for use with a forage harvester having a cutter drum for cutting stalk crops from the ground and delivering the stalks to the cutter drum for being chopped into pieces, the header including several intake and mowing arrangements arranged in side-by-side relationship to each other and being driven about respective upright axes for cutting and conveying the harvested crop, a transverse conveying channel being provided to the rear of the intake and mowing arrangements through which the harvested crop can be transported at least approximately transverse to a forward operating direction, and a discharge channel being located in the center of the header at downstream ends of portions of the conveying channel located on opposite sides of said center of the header, the improvement comprising: a centrally located conveying arrangement being mounted ahead of and above said transverse conveying channel at a location no farther forward than said intake and mowing arrangements; and a drive coupled to said conveying arrangement for driving it such as to cause any crop stalks which emerge from said transverse conveying channel in the vicinity of the conveying arrangement to be delivered toward said discharge channel.

2. The header defined in claim 1 wherein said conveying arrangement is located in fore-and-aft alignment with said discharge channel.

3. The header defined in claim 1 wherein said conveying arrangement is located between adjacent intake and mowing arrangements.

4. The header defined in claim 3 wherein a table is located on top of and bridges a space between said adjacent intake and mowing arrangements; and said conveying arrangement being mounted so that an upper conveying portion thereof extends to a height above said table.

5. The header defined in claim 1 wherein said conveying arrangement includes at least one conveyor disk having driver teeth arranged around its periphery being mounted for rotation about a horizontal transverse axis.

6. The header defined in claim 1 wherein said conveying arrangement includes at least two conveyor disks arranged one in front of the other for rotation about respective horizontal transverse axes; and a drive element interconnecting the two conveyor disks for rotation together such that upper parts thereof move from front to rear.

7. The header defined in claim 1 wherein said conveying arrangement is a fore-and-aft conveyor belt provided with transverse ribs serving as drivers.

8. The header defined in claim 1 wherein said drive includes a drive box located along the upright axis of and atop one of said intake and cutting arrangements, whereby said conveying arrangement is driven with said one of said intake and mowing arrangements.

* * * * *

UNITED STATES PATENT AND TRADEMARK OFFICE
CERTIFICATE OF CORRECTION

PATENT NO. : 6,502,378 B2
DATED : January 7, 2003
INVENTOR(S) : Richard Wubbels et al.

It is certified that error appears in the above-identified patent and that said Letters Patent is hereby corrected as shown below:

<u>Title page,</u>
Item [73], Assignee, should read:
-- Maschinenfabrik Kemper GmbH & CO KG, 48703 Stadtlohn, Breul, Germany --.

Signed and Sealed this

Ninth Day of May, 2006

JON W. DUDAS
*Director of the United States Patent and Trademark Office*